US008117388B2

(12) United States Patent
Jernigan, IV

(10) Patent No.: US 8,117,388 B2
(45) Date of Patent: Feb. 14, 2012

(54) DATA DISTRIBUTION THROUGH CAPACITY LEVELING IN A STRIPED FILE SYSTEM

(75) Inventor: Richard P. Jernigan, IV, Ambridge, PA (US)

(73) Assignee: NetApp, Inc., Sunnyvale, CA (US)

( * ) Notice: Subject to any disclaimer, the term of this patent is extended or adjusted under 35 U.S.C. 154(b) by 428 days.

(21) Appl. No.: 12/433,089

(22) Filed: Apr. 30, 2009

(65) Prior Publication Data
US 2010/0281214 A1 Nov. 4, 2010

(51) Int. Cl.
G06F 12/16 (2006.01)
(52) U.S. Cl. .......................................... 711/114; 707/10
(58) Field of Classification Search .................. 711/114, 711/118; 707/10
See application file for complete search history.

(56) References Cited

U.S. PATENT DOCUMENTS

| | | |
|---|---|---|
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,155,835 A | 10/1992 | Belsan |
| 5,163,131 A | 11/1992 | Row et al. |
| 5,202,979 A | 4/1993 | Hillis et al. |
| 5,355,453 A | 10/1994 | Row et al. |
| 5,485,579 A | 1/1996 | Hitz et al. |
| 5,581,724 A | 12/1996 | Belsan et al. |
| 5,701,516 A | 12/1997 | Cheng et al. |
| 5,802,366 A | 9/1998 | Row et al. |
| 5,819,292 A | 10/1998 | Hitz et al. |
| 5,897,661 A | 4/1999 | Baranovsky et al. |
| 5,931,918 A | 8/1999 | Row et al. |
| 5,941,972 A | 8/1999 | Hoese et al. |
| 5,963,962 A | 10/1999 | Hitz et al. |
| 5,987,477 A | 11/1999 | Schmuck et al. |
| 6,032,216 A | 2/2000 | Schmuck et al. |
| 6,038,570 A | 3/2000 | Hitz et al. |
| 6,065,037 A | 5/2000 | Hitz et al. |
| 6,173,293 B1 | 1/2001 | Thekkath et al. |

(Continued)

FOREIGN PATENT DOCUMENTS
EP 0 892 347 1/1999
(Continued)

OTHER PUBLICATIONS

Administration Guide found at http://www.openafs.org/pages/doc/AdminGuide/auagd010.htm, visited on Mar. 2, 2005, 34 pages.

(Continued)

*Primary Examiner* — Son Dinh
(74) *Attorney, Agent, or Firm* — Cesari and McKenna, LLP

(57) ABSTRACT

A data distribution technique is configured to provide capacity leveling in a striped file system. When a new node is added to a striped volume set, the striping table is evolved to accommodate the newly added node. Each node of a cluster is illustratively associated with a capacity value that takes into account, e.g., processor speed, number of processors, hardware configuration and/or software available for the node. During the evolution process of the striping table, the technique apportions stripes of the SVS among the nodes in a manner so that they are optimally assigned to the nodes in accordance with each node's capacity value. By utilizing the evolutionary striping table that incorporates capacity values, heterogeneous nodes may be utilized to their maximum capacity within a striped volume set, thereby reducing underutilized processing resources.

21 Claims, 16 Drawing Sheets

U.S. PATENT DOCUMENTS

| | | | |
|---|---|---|---|
| 6,275,898 | B1 | 8/2001 | DeKoning |
| 6,324,581 | B1 | 11/2001 | Xu et al. |
| 6,425,035 | B2 | 7/2002 | Hoese et al. |
| 6,502,166 | B1 | 12/2002 | Cassidy |
| 6,564,252 | B1 | 5/2003 | Hickman et al. |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,829,678 | B1 | 12/2004 | Sawdon et al. |
| 6,868,417 | B2 | 3/2005 | Kazar et al. |
| 6,931,450 | B2 | 8/2005 | Howard et al. |
| 6,978,283 | B1 | 12/2005 | Edwards et al. |
| 7,010,528 | B2 | 3/2006 | Curran et al. |
| 7,038,058 | B2 | 5/2006 | Lee et al. |
| 7,159,093 | B2 | 1/2007 | Dalal et al. |
| 7,162,486 | B2 | 1/2007 | Patel et al. |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,409,494 | B2 | 8/2008 | Edwards et al. |
| 7,409,497 | B1 * | 8/2008 | Kazar et al. .................. 711/114 |
| 7,412,496 | B2 | 8/2008 | Fridella et al. |
| 7,590,807 | B2 | 9/2009 | McGovern et al. |
| 7,617,370 | B2 | 11/2009 | Jernigan, IV et al. |
| 7,698,289 | B2 | 4/2010 | Kazar et al. |
| 7,743,111 | B2 | 6/2010 | Soltis |
| 7,769,717 | B2 | 8/2010 | Federwisch et al. |
| 2002/0049883 | A1 | 4/2002 | Schneider et al. |
| 2003/0188045 | A1 | 10/2003 | Jacobson |
| 2004/0030668 | A1 | 2/2004 | Pawlowski et al. |
| 2004/0122917 | A1 | 6/2004 | Menon et al. |
| 2004/0139167 | A1 | 7/2004 | Edsall et al. |
| 2005/0192932 | A1 | 9/2005 | Jernigan et al. |
| 2006/0248379 | A1 | 11/2006 | Jernigan et al. |
| 2007/0088702 | A1 | 4/2007 | Fridella et al. |

FOREIGN PATENT DOCUMENTS

| | | |
|---|---|---|
| JP | 10003440 | 6/1998 |
| WO | WO 00/07101 | 2/2000 |

OTHER PUBLICATIONS

Auspex Systems, LFS—A Local File System for Multiprocessor NFS Network Servers, 1994, 6 pages.

Blasgen, M.W. et al., System R: An architectural Overview,Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brinkmann, A. et al., Efficient Distributed Data Placement Strategies for Storage Area Networks, Proceedings of the Twelfth Annual ACM Symposium on Parallel Algorithms and Architectures, ACM, Jul. 2000, 10 pages.

Brown, Mark R. et al., The Alpine file system, ACM Transactions on Computing Systems, 3(4):261-293, Nov. 1985.

Carns, P. H., et al, "PVFS: A Parallel File System for Linux Clusters", Proceedings of the 4.sup.th Annual Linux Showcase and Conference, Atlanta, GA, Oct. 2000, pp. 317-327.

Celerra File Server Architecture for High Availability, EMC2 where information lives, Aug. 1999, 12 pages.

Chutani, Sailesh, et al., The Episode File System, in Proceedings of the USENIX Winter 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Ganger, Gregory R., et al., Disk Subsystem Load Balancing: Disk Striping vs. Conventional Data Placement, Department of Electrical Engineering and Computer Science, University of Michigan, Ann Arbor, Jan. 1993.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hartman, J. H., et al., "Zebra: A Striped Network File System" Proceedings of the Usenix File Systems Workshop, Apr. 1998 pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Hitz, Dave et al., File System Design for an NFS File Server Appliance, Technical Report 3002, Rev. C395, presented Jan. 19, 1994, 23 pages.

Ho, T.K., et al., A Row Permutated Data Reorganization Algorithm for Growing Server-Less Video-on-Demand Systems, Department of Information Engineering, The Chinese University of Hong Kong, Satin, N. T., Hong Kong, May 2003.

Honicky, R.J., et al., A Fast Algorithm for Online Placement and Reorganization of Replicated Data, Storage Systems Research Center, University of California, Santa Cruz, Apr. 2003.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

NetApp, Inc., PCT Notification of Transmittal of the International Search Report and the Written Opinion of the International Searching Authority, International Application No: PCT/US2010/001262, International Filing Date: Apr. 29, 2010, Document mailed on Aug. 18, 2010, 14 pages, European Patent Office, Rijswijk, Netherlands.

Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.

Network Appliance, Inc., Notification of Transmittal of the International Search Report and the Written Opinion of the International Searching Authority, or the Declaration, International Application No. PCT/US2005/031220, International Filing Date Sep. 1, 2005, Date of Mailing Oct. 18, 2006, 12 pages.
Network Appliance, Inc., Notification of Transmittal of the International Search Report and the Written Opinion of the International Searching Authority, or the Declaration, International Application No. PCT/US2006/016055, International Filing Date Apr. 27, 2006, Date of Mailing Nov. 11, 2006, 10 pages.
Ousterhout, John K. et al., The Sprite Network Operating System, Computer Science Division, Department of Electrical Engineering and Computer Sciences, Univ. of CA, Berkley, Nov. 19, 1987, 32 pages.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.
Performance Without Compromise: The Virtual Storage Architecture 1997, 11 pages.
Quinlan, Sean, A Cached WORM File System, Software-Practice and Experience, 21(12):1289-1299 (1991).
Rosenberg, J., et al., Stability in a Persistant Store Based on a Large Virtual Memory, In Security and Persistence, Rosenber, J. & Keedy, J.L. (ed), Springer-Verlag (1990) pp. 229-245.
Rosenblum, Mendel, et al. The Design and Implementation of a Log-Structured File System Jul. 24, 1991 pp. 1-15.
Rosenblum, Mendel, The Design and Implementation of a Log-Structured File System, 1992, pp. 1-93.
Rosenblum, Mendel, et al., The Design and Implementation of a Log-Structured File System, In Proceedings of ACM Transactions on Computer Systems, (10)1:26-52, Feb. 1992.
Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.
Ross, R. B. et al., "Using the Parallel Virtual File System", Jul. 2002, 31 pages.
Sandberg, Russel et al., Design and implementation of the Sun Network Filesystem. In Proc. Summer 1985 USENIX Conf., pp. 119-130, Portland OR (USA), Jun. 1985.
Santry, Douglas S., et al., Deciding When to Forget in the Elephant File System, Operating Systems Review, 34(5), (Dec. 1999) pp. 110-123.
Satyanarayanan, M., et al., The ITC Distributed File System: Principles and Design, In Proceedings of the 10th ACM Symposium on Operating Systems Principles, (19)5:56-67, Dec. 1985.
Satyanarayanan, M., A survey of distributed file-systems. Annual Review of Computing Science, 4(73-104), 1989.
Satyanarayanan, M., et al., Coda: A highly available file system for a distributed workstation environment Carnegie Mellon University, CMU-ITC.
Satyanarayanan, M., et al., Coda: A highly available file system for a distributed workstation environment. IEEE Transactions on Computers, 39(4):447-459, 1990.
Satyanarayanan, M., Scalable, Secure, and Highly Available Distributed File Access, Computer May 1990: 9-21.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.
Sidebotham, Bob, Volumes: The Andrew File System Data Structuring Primitive, EEUG Conference Proceedings, Manchester, UK, Autumn 1986.
Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.
Subramanian, Muralidhar, et al., Performance Challenges in Object-Relational DBMSs, Data Engineering Journal 22, Feb. 1999 pp. 28-32.
Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.
Welch, Brent B., et al., Pseudo-File-Systems, Computer Science Division, Department of Electrical Engineering and Computer Sciences. Univ. of CA, Berkley, Oct. 1989, 22 pages.
West, Michael, et al. The ITC Distributed File System: Prototype and Experience, Carnegie-Mellon University, Technical Report CMU-ITC-040, Mar. 1985, 17 pages.

* cited by examiner

DATA DISTRIBUTION THROUGH CAPACITY LEVELING IN A STRIPED FILE SYSTEM

RELATED APPLICATION

The present application is related to U.S. patent application Ser. No. 11/119,278, filed on Apr. 29, 2005, entitled STORAGE SYSTEM ARCHITECTURE FOR STRIPING DATA CONTAINER CONTENT ACROSS VOLUMES OF A CLUSTER, now published as U.S. Publication No. US2005-0192932, on Sep. 1, 2005, by Richard Jernigan et al., the contents of which are hereby incorporated by reference.

FIELD OF THE INVENTION

The present invention relates to striped file systems and, more particularly, to capacity leveling across a plurality of nodes of a striped file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD). It should be noted that in alternative embodiments, the storage devices may comprise solid state devices, e.g., flash memory, battery backed up non-volatile random access memory, etc. As such, while this description is written in terms of disks, those embodiments should be viewed as exemplary only.

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set, where each volume is serviced by a different storage system, thereby distributing the load for the single data container among a plurality of storage systems. One technique for data container striping is described in the above-incorporated U.S. Publication No. US2005-0192932, entitled STORAGE SYSTEM ARCHITECTURE FOR STRIPING DATA CONTAINER CONTENT ACROSS VOLUMES OF A CLUSTER. Typically, when the striped volume set is first generated, each of the constituent nodes servicing the constituent volumes of the striped volume set utilizes the same or similar generation technology. That is, each node typically comprises the same or substantially the same hardware and/or software configurations. Thus, the nodes may be viewed as homogeneous as each is substantially identical to each other. A noted disadvantage of such systems arises when a striped volume set is expanded at a later point in time and a customer uses later (i.e., newer) generation hardware and/or software for the newly added nodes. As the newly added nodes utilize the most up to date hardware and/or software, they typically have additional computational power as compared to the original nodes of a cluster. More generally, this problem may be noted when any heterogeneous cluster is formed, that is, when the nodes of a cluster utilize systems having substantially different functionality and/or processor capabilities. In such heterogeneous systems, each node is typically utilized an equal amount for striping operations. The noted disadvantage arises as later generation nodes may have additional processor capabilities that remain under or unutilized. The advantage of using new and/or faster nodes is thus wasted as nodes are utilized, in effect, as if they were homogeneous to the least powerful node of a cluster, i.e., the original nodes. To avoid such a waste of processing power, a user must ensure that all nodes are of a common homogeneous type. This may be accomplished by, for example, purchasing older nodes or by replacing the older nodes with newer models. Both of these solutions are not optimal and raise the total cost of ownership of a clustered storage system.

SUMMARY OF THE INVENTION

The present invention overcomes the disadvantages of the prior art by providing a data distribution technique configured to provide capacity leveling in a striped file system. A striped volume set is associated with a set of striping rules including, e.g., a striping data structure that may be implemented, e.g., as a striping table that identifies an ordered list of volumes and associated nodes to which data is striped. Each node of the cluster includes a disk element adapted to servicing a volume of the SVS and a network element adapted to redirect a data access request to any de-module of the cluster. The content of a data container is apportioned among the volumes of the SVS to thereby improve the efficiency of storage service provided by the cluster. To that end, the striping table specifies the manner in which the data container content is apportioned as stripes across a plurality of volumes. In operation, when a new node is added to a striped volume set, the striping table is evolved to accommodate the newly added node. In an illustrative embodiment, each node of a cluster is associated with a capacity value that takes into account, e.g., processor speed, number of processors, hardware configuration and/or software available for the node. During an evolution process of the striping table, the technique apportions stripes of the SVS among the nodes in a manner so that they are optimally assigned to the nodes in accordance with each node's capacity value. For example, in a two node system, with the first node having a capacity value of 100 and the second node having a capacity value of 200, twice as many stripes should be serviced by the second node as compared to the first node for optimal performance. By utilizing the evolutionary striping table that incorporates capacity values, heterogeneous nodes may be utilized to their maximum capacity within a striped volume set, thereby reducing underutilized processing resources.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
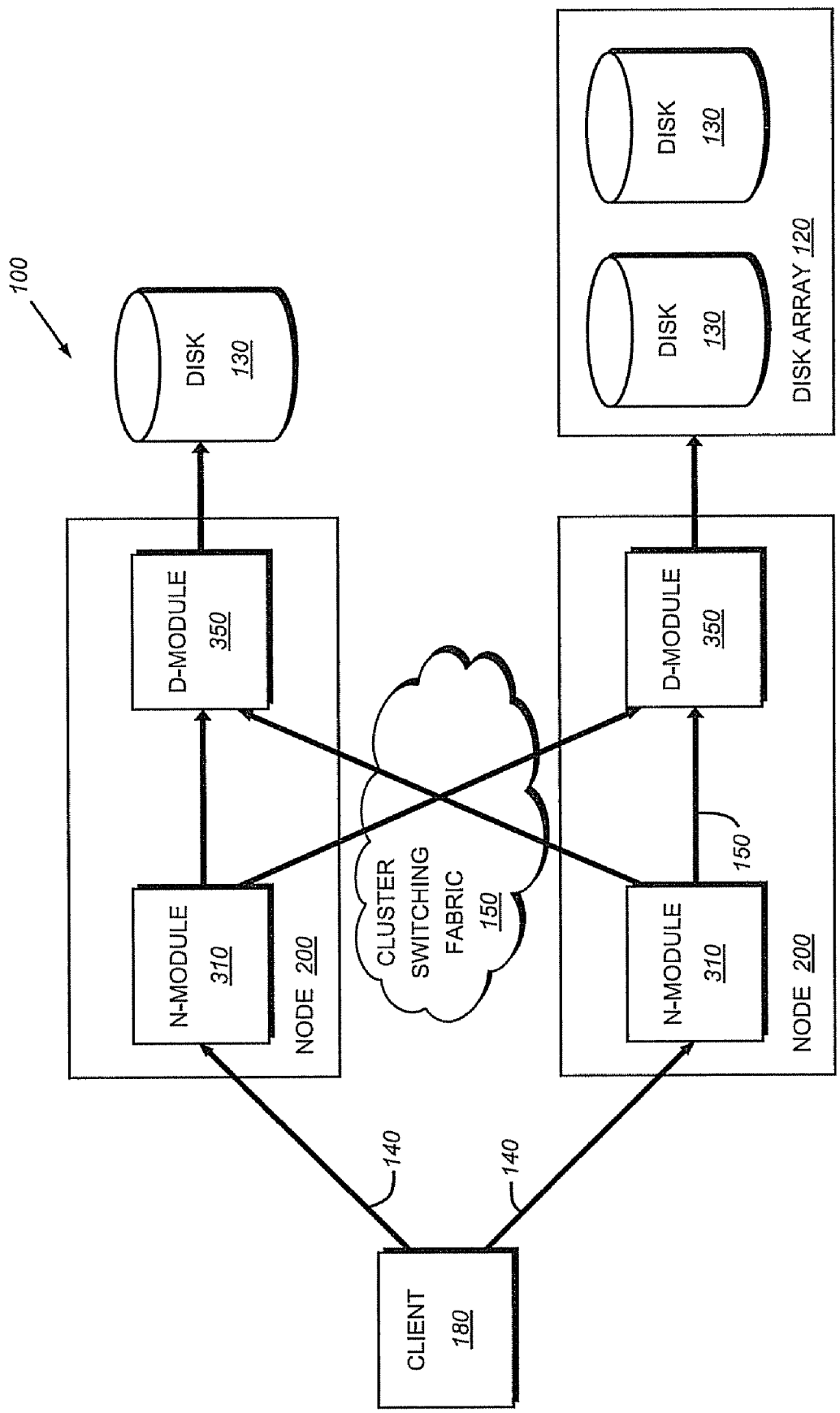
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices in accordance with an illustrative embodiment of the present invention. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773, titled METHOD AND SYSTEM FOR RESPONDING TO FILE SYSTEM REQUESTS, by M. Kazar et al., issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
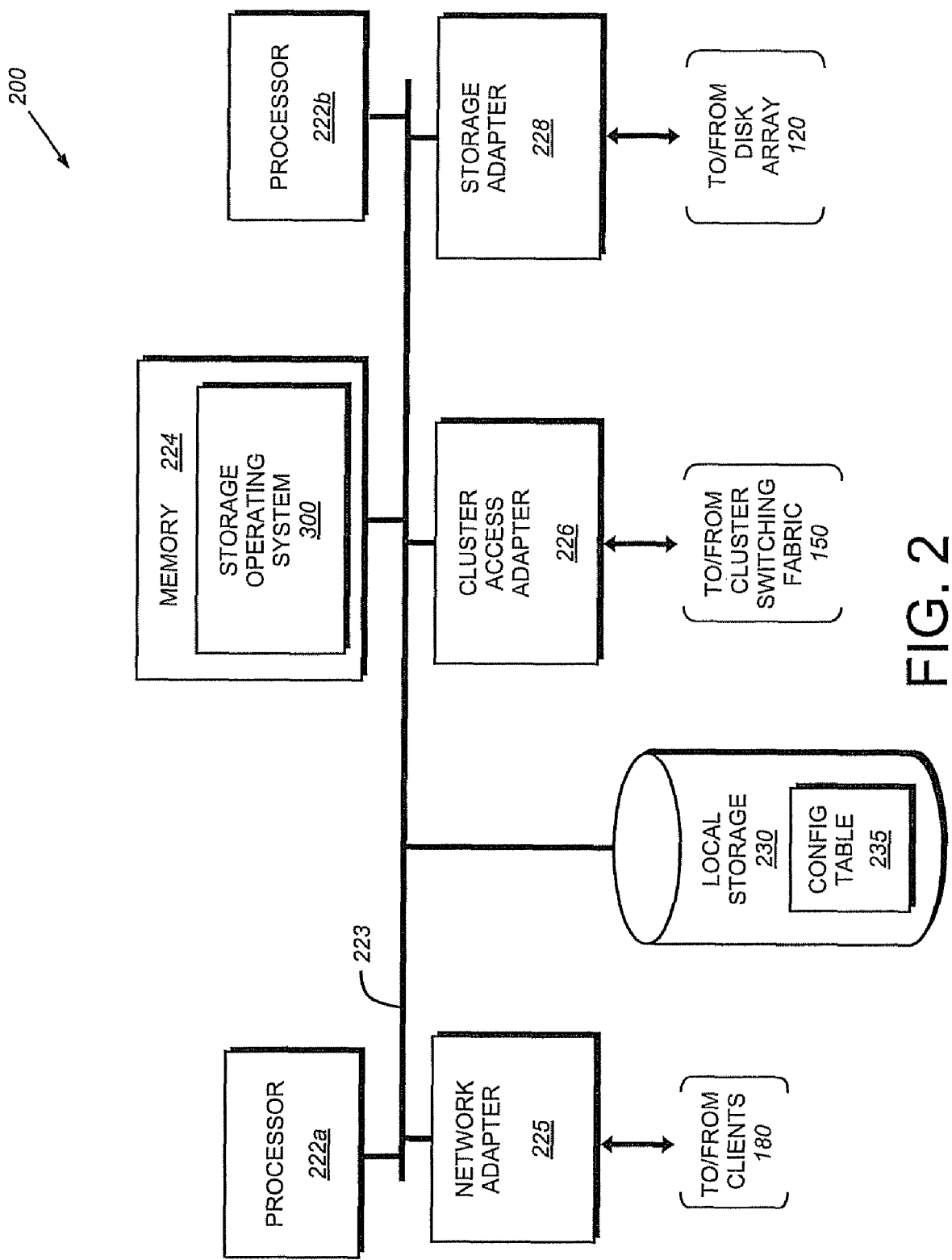
FIG. 2 is a schematic block diagram of a node in accordance with an illustrative embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternative embodiments, where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable storage media including, e.g., flash memory, solid state storage, etc., may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
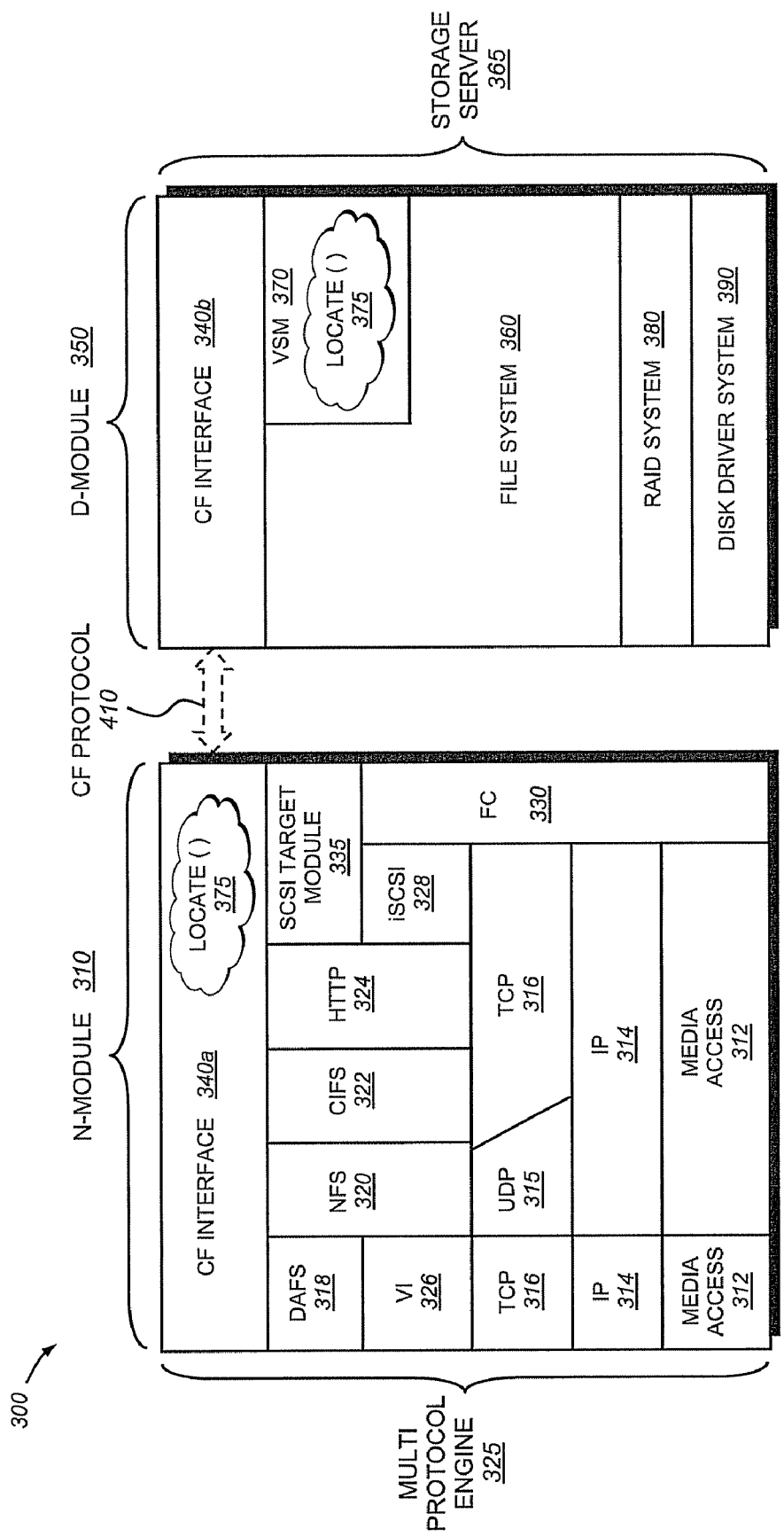
FIG. 3 is a schematic block diagram of a storage operating system that may be advantageously used with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software modules organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
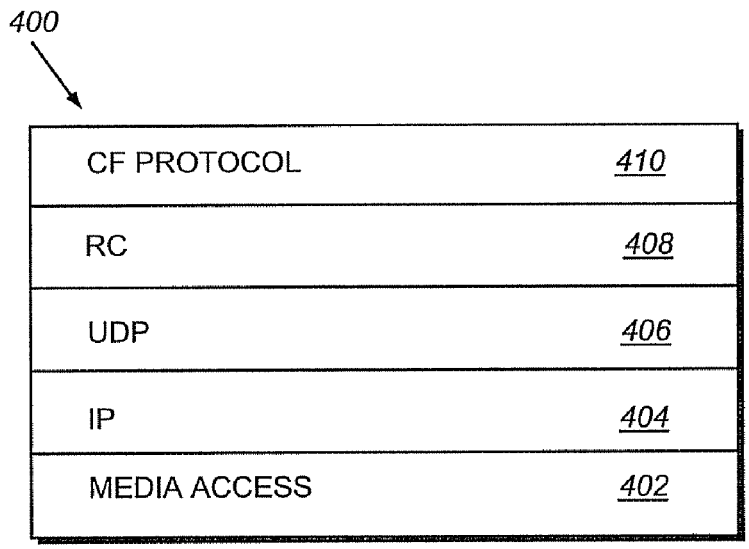
FIG. 4 is a schematic block diagram illustrating the format of a cluster fabric (CF) message in accordance with an illustrative embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
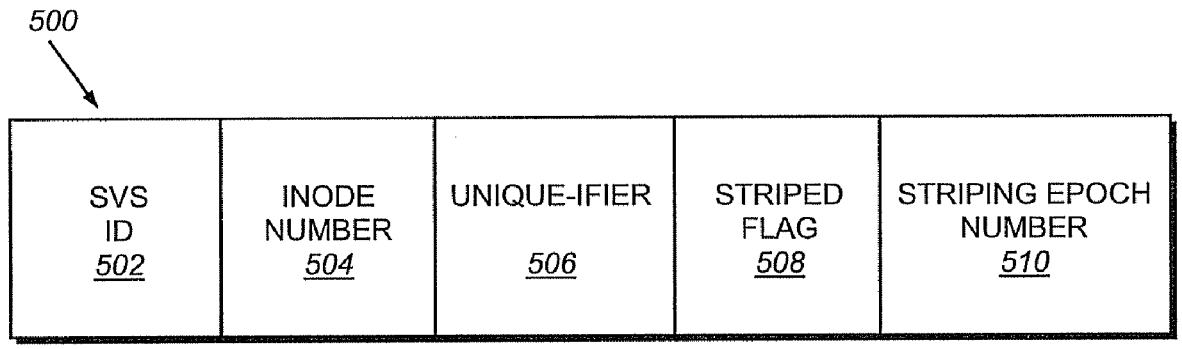
FIG. 5 is a schematic block diagram illustrating the format of a data container handle in accordance with an illustrative embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506 a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
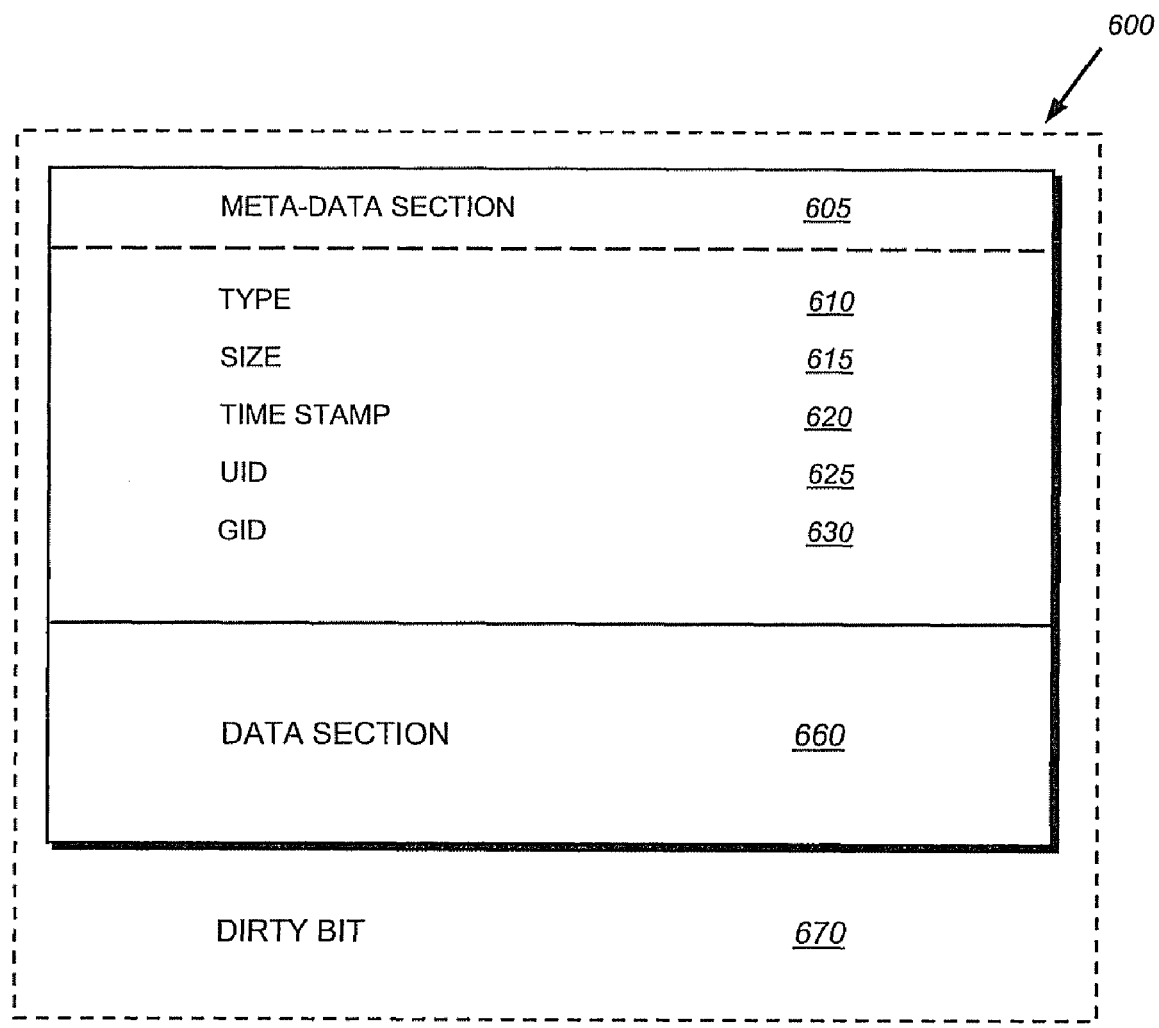
FIG. 6 is a schematic block diagram of an exemplary inode in accordance with an illustrative embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk.

Figure 7:
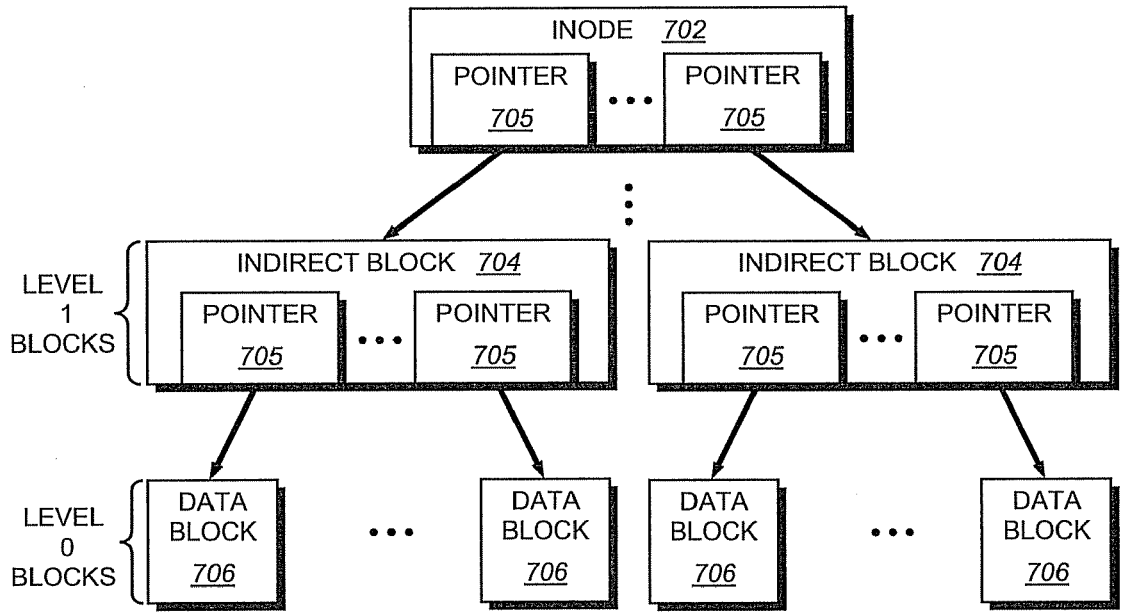
FIG. 7 is a schematic block diagram of an exemplary buffer tree in accordance with an illustrative embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. Pat. No. 7,409,494, titled EXTENSION OF WRITE ANYWHERE FILE SYSTEM LAYOUT, by John K. Edwards et al., now issued on Aug. 5, 2008, and assigned to NetApp, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
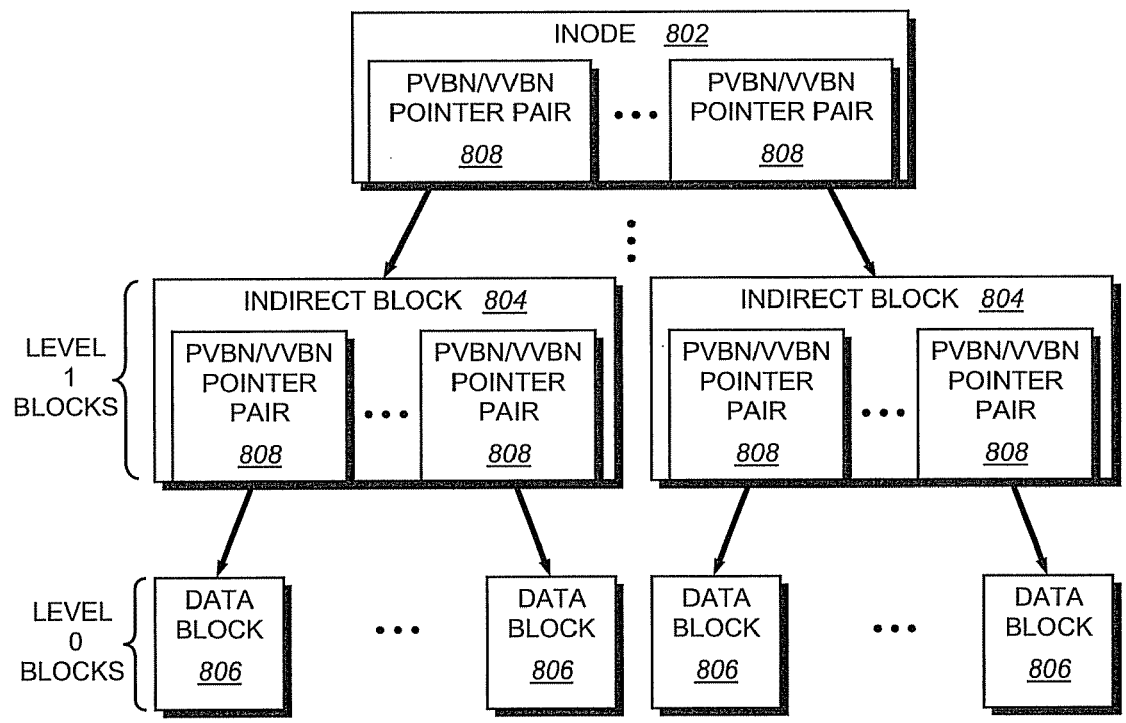
FIG. 8 is a schematic block diagram of an illustrative embodiment of a buffer tree of a file that may be advantageously used with the present invention.

In one dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
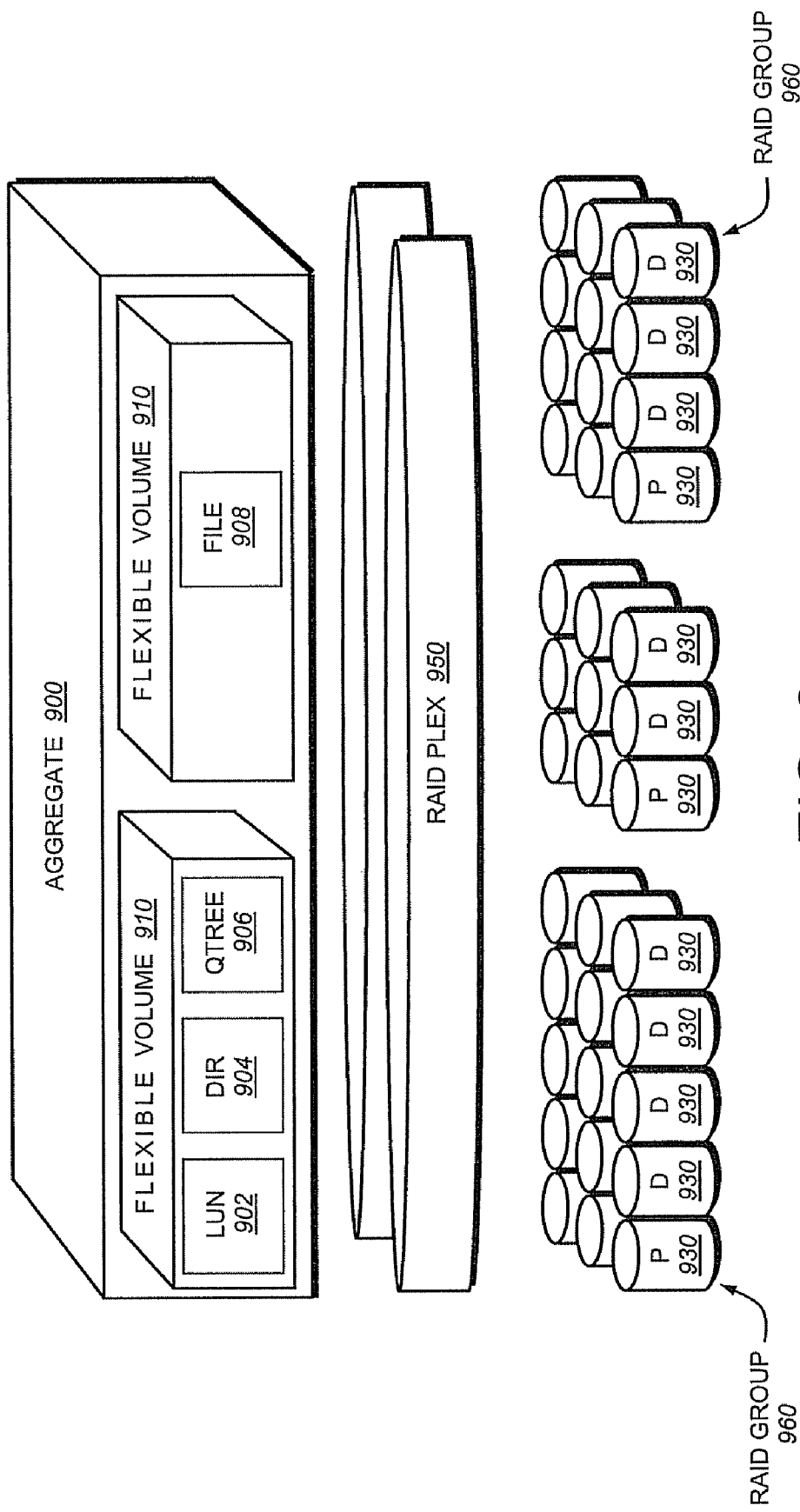
FIG. 9 is a schematic block diagram of an exemplary aggregate in accordance with an illustrative embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
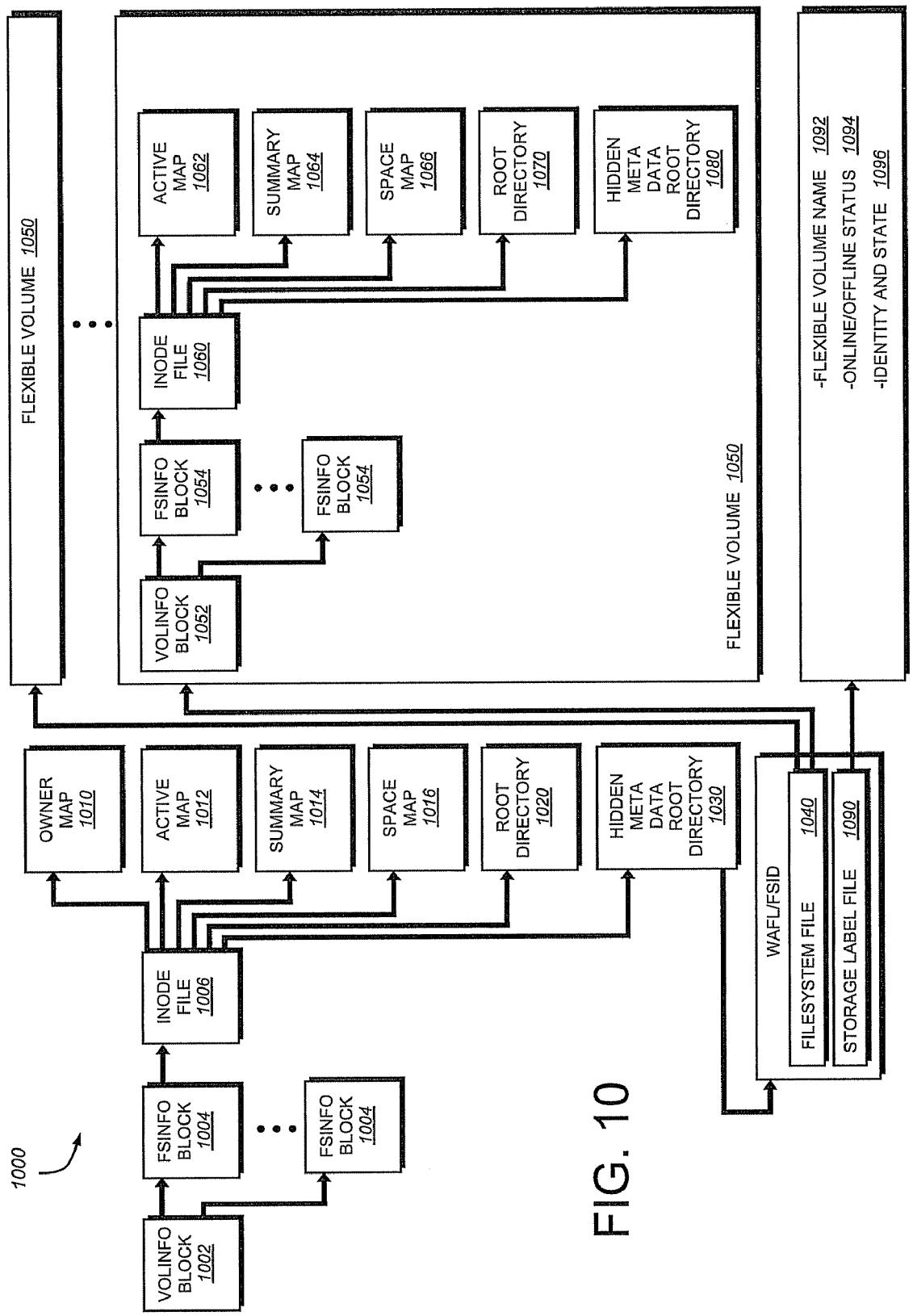
FIG. 10 is a schematic block diagram of an exemplary on-disk layout of the aggregate in accordance with an illustrative embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/ directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage labelfile directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
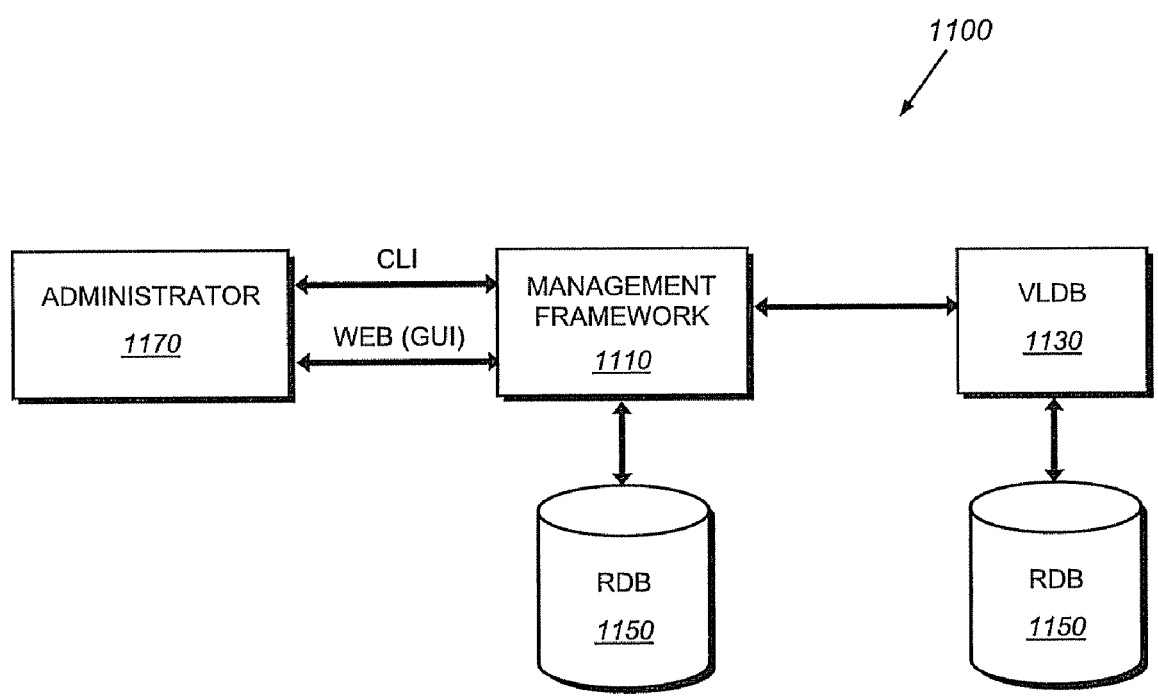
FIG. 11 is a schematic block diagram illustrating a collection of management processes in accordance with an illustrative embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
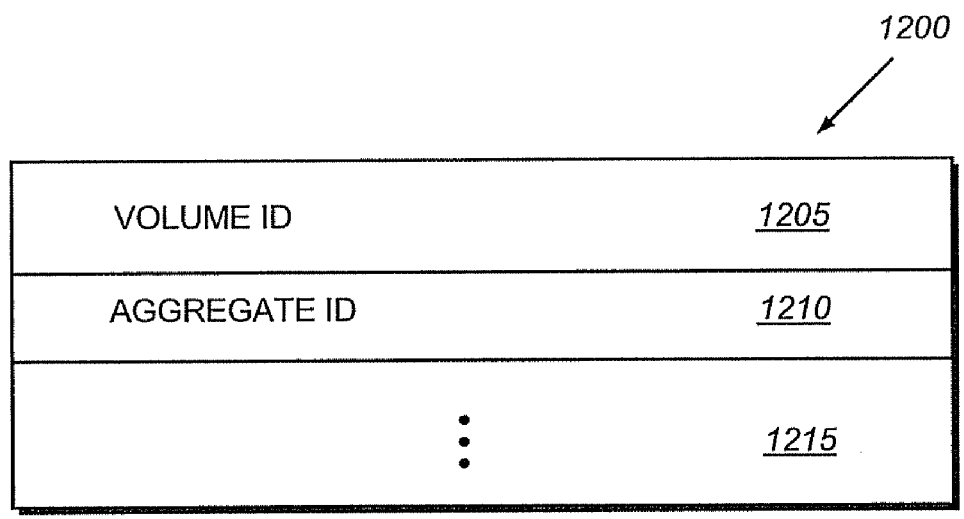
FIG. 12 is a schematic block diagram of a volume location database (VLDB) volume entry in accordance with an illustrative embodiment of the present invention.
Figure 13:
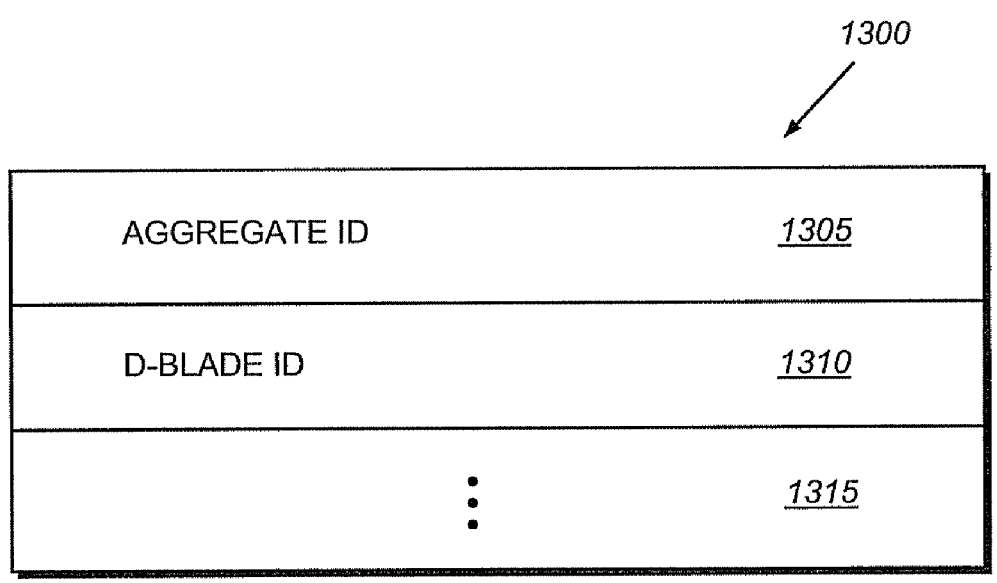
FIG. 13 is a schematic block diagram of a VLDB aggregate entry in accordance with an illustrative embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-module ID field 1310 and, in alternate embodiments, additional fields 1315. The aggregate ID field 1305 contains an ID of a particular aggregate 900 in the cluster 100. The D-module ID field 1310 contains an ID of the D-module hosting the particular aggregate identified by the aggregate ID field 1305.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

A storage system architecture is provided that illustratively comprises two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

The SVS comprises a meta-data volume (MDV) and one or more data volumes (DV). The MDV is configured to store a canonical copy of meta-data, including access control lists (ACLs) and directories, associated with all files stored on the SVS, whereas each DV is configured to store, at least, data content of those files. For each file stored on the SVS, one volume is designated the CAV and, to that end, is configured to store ("cache") certain, rapidly-changing attribute meta-data associated with that file to thereby offload access requests that would otherwise be directed to the MDV. In one embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In an alternate embodiment, data for files is striped across the MDV and the DVs. In a further alternative embodiment, a MDV may be eliminated, with the data normally contained on the MDV distributed among the DVs of a SVS.

Figure 14:
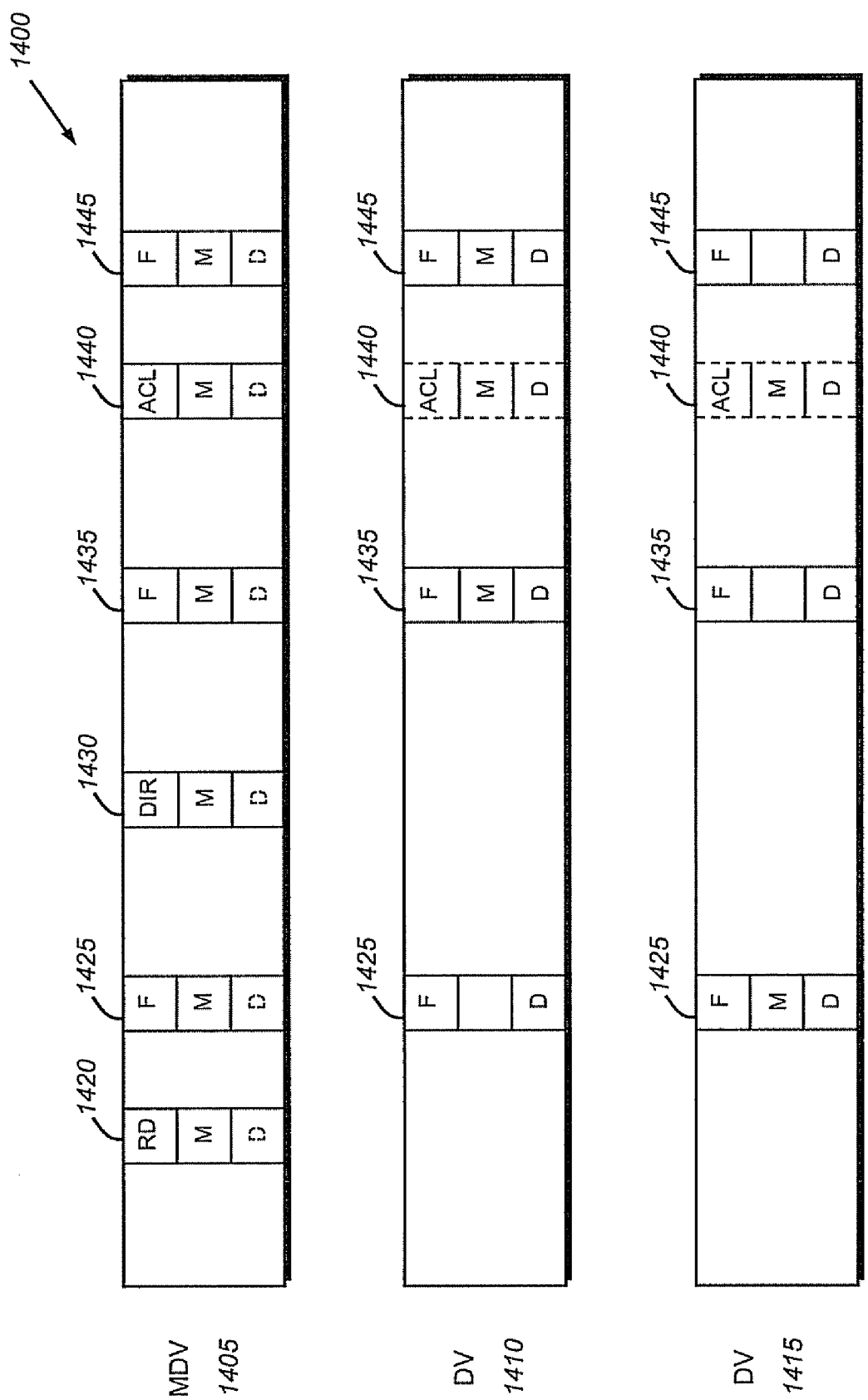
FIG. 14 is a schematic block diagram of a striped volume set (SVS) in accordance with an illustrative embodiment of the present invention.

FIG. 14 is a schematic block diagram of an SVS 1400 in accordance with an illustrative embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. Note that DV does not store directories or other device inodes/constructs, such as symbolic links; however, each DV does store F inodes, and may store cached copies of ACL inodes, that are arranged in the same locations as their respective inodes in the MDV

1405. A particular DV may not store a copy of an inode until an I/O request for the data container associated with the inode is received by the D-Module serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time stamps 620.

Figure 15:
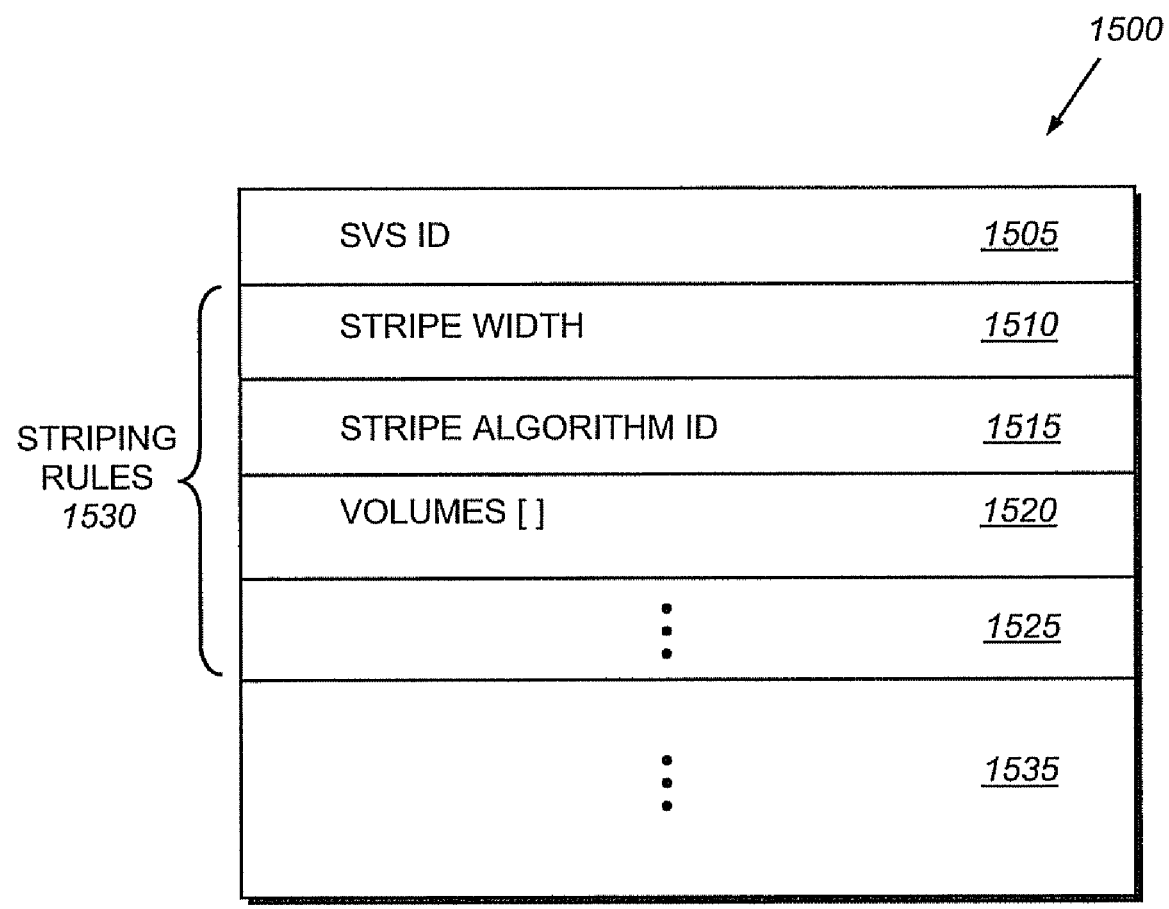
FIG. 15 is a schematic block diagram of a VLDB SVS entry in accordance with an illustrative embodiment the present invention.

Illustratively, the SVS is associated with a set of striping rules that define a stripe algorithm, a stripe width and an ordered list of volumes within the SVS (a striping data structure that is illustratively implemented as a striping table). It should be noted that while the term striping table is used herein, it should be taken to mean any form of data structure that enables a VSM to identify the order in which data is to be striped on a SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternative embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In one embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe.

The ordered list of volumes field 1520 contains the IDs of the volumes comprising the SVS and serves as a striping table to determine data layout in a capacity leveled manner in accordance with an illustrative embodiment of the present invention. In an illustrative embodiment, the ordered list of volumes comprises a plurality of tuples comprising of a flexible volume ID and the aggregate ID storing the flexible volume. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

In operation, the set of striping rules effectively defines a striping table identifying an ordered set of D-modules to be utilized for storing blocks of a SVS. By apportioning the SVS among these various D-modules, the overall processing consumption of a single module is limited and therefore reduces the chance that a particular module may generate a backlog by, for example, becoming a hot spot.

A Locate( ) function 375 is provided that enables the VSM 370 and other modules (such as those of N-module 310) to locate a D-module 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-module 310 of a node 200, where it is parsed through the multi-protocol engine 325 to the appropriate protocol server of N-module 310.

To determine the location of a D-module 350 to which to transmit a CF message 400, the N-module 310 may first retrieve a SVS entry 1500 to acquire the striping rules 1530 (and list of volumes 1520) associated with the SVS. The N-module 310 then executes the Locate( ) function 375 to identify the appropriate volume to which to direct an operation. Thereafter, the N-Module may retrieve the appropriate VLDB volume entry 1200 to identify the aggregate containing the volume and the appropriate VLDB aggregate entry 1300 to ultimately identify the appropriate D-module 350. The protocol server of N-module 310 then transmits the CF message 400 to the D-module 350.

Figure 16:
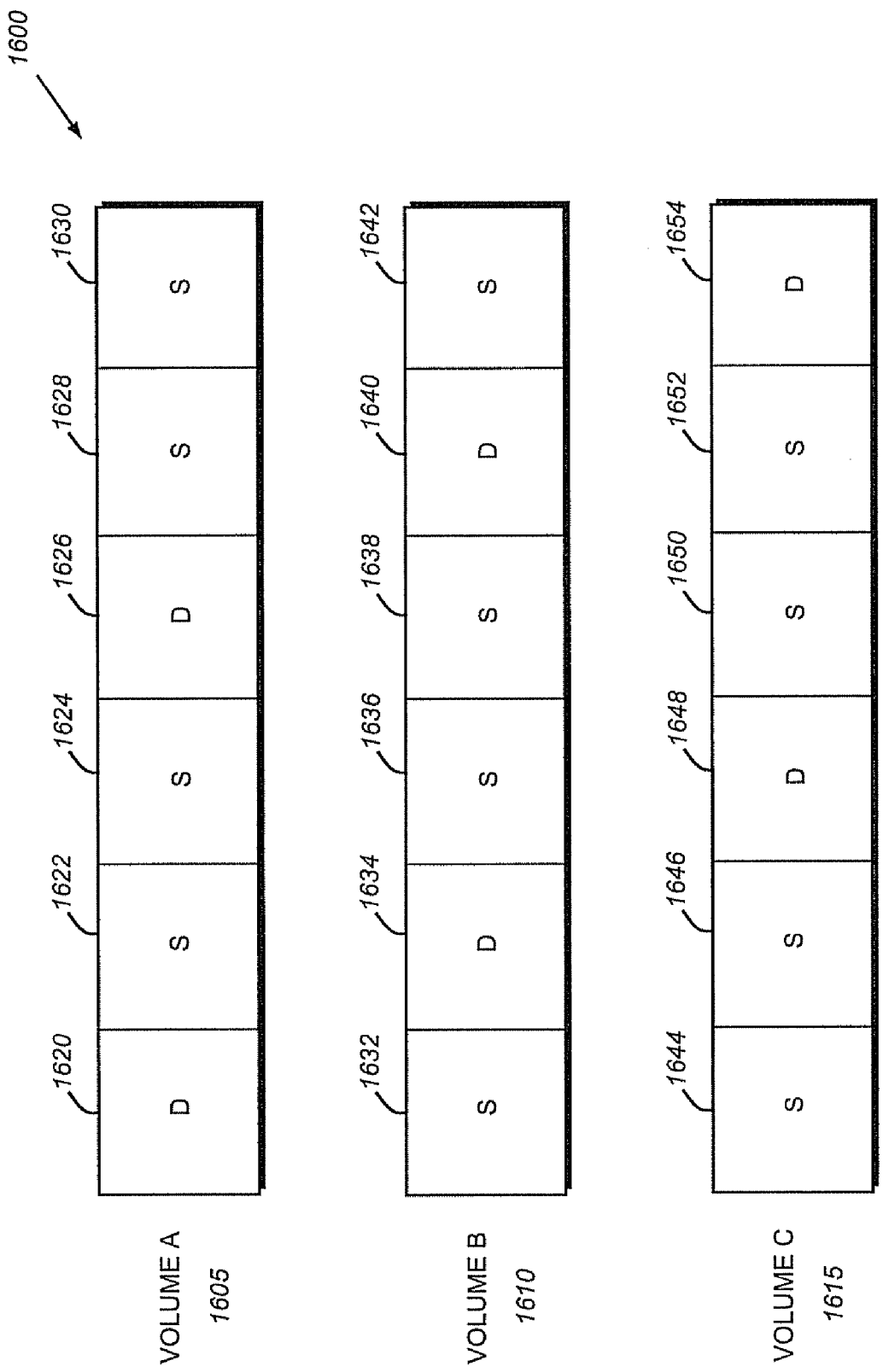
FIG. 16 is a schematic block diagram illustrating the periodic sparseness of file content stored on volumes of a SVS in accordance with an illustrative embodiment of the present invention.

FIG. 16 is a schematic block diagram illustrating the periodic sparseness of file content stored on volumes A 1605, B 1610 and C 1615 of SVS 1600 in accordance with an illustrative embodiment of the present invention. As noted, file content is periodically sparse according to the SVS striping rules, which specify a striping algorithm (as indicated by stripe algorithm ID field 1515) and a size/width of each stripe (as indicated by stripe width field 1510). Note that, in one embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume C 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Capacity Leveling

The present invention provides a data distribution technique configured to provide capacity leveling in a striped file system. A striped volume set is associated with a set of striping rules including, e.g., a striping table 1500 that identifies an ordered list of volumes and associated nodes to which data is striped. Each node of the cluster includes a disk element adapted to servicing a volume of the SVS and a network element adapted to redirect a data access request to any de-module of the cluster. The content of the data container is apportioned among the volumes of the SVS to thereby improve the efficiency of storage service provided by the cluster. To that end, the striping table specifies the manner in which the data container content is apportioned a stripes across a plurality of volumes. In operation, when a new node is added to a striped volume set, the striping table is evolved, i.e., iteratively updated, to accommodate the newly added node. In one embodiment, each node of a cluster is associated with a capacity value that takes into account, e.g., processor speed, number of processors, hardware configuration and/or software available for the node. During an evolution process of the striping table, the technique apportions stripes of the SVS among the nodes in a manner so that they are optimally assigned to the nodes in accordance with each node's capacity value. For example, in a two node system, with the first node having a capacity value of 100 and the second node having a capacity value of 200, twice as many stripes should be serviced by the second node as compared to the first node for optimal performance. By utilizing the striping table described herein that incorporates capacity values, heterogeneous nodes, i.e., nodes with differing capacity values, may be better utilized within a striped volume set, thereby reducing underutilized processing resources. That is, nodes may be utilized without requiring higher capacity nodes to throttle their performance to the least powerful node in a cluster.

Figure 17:
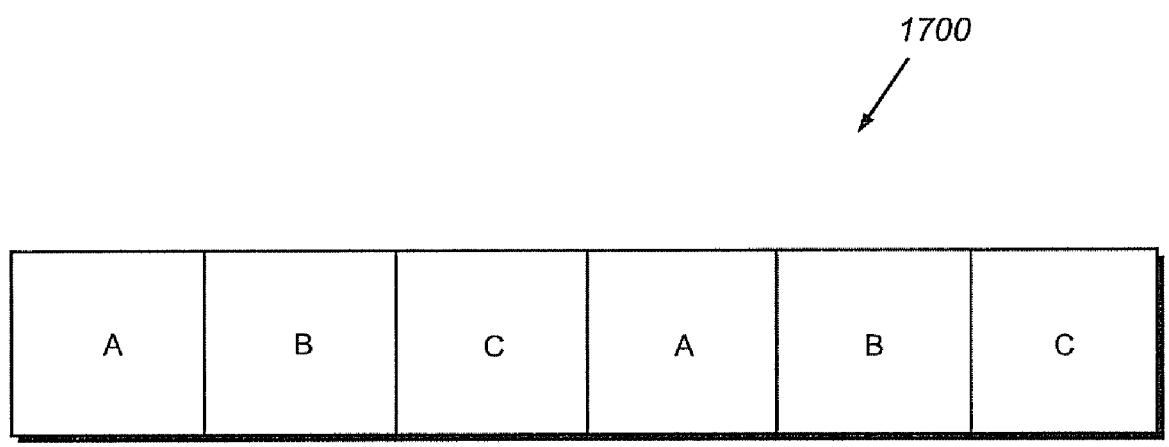
FIG. 17 is a schematic block diagram illustrating the striping of a data container across a SVS in accordance with an illustrative embodiment of the present invention.

FIG. 17 is a schematic block diagram illustrating an exemplary striping table for the data container shown in FIG. 16 in accordance with an illustrative embodiment of the present invention. Illustratively, the striping table 1700 indicates that the first block of the data container is stored on a volume A of a first node, the second block is stored on a volume B of a second node, etc. The striping table 1700 may be generated by, e.g., the VSM 375, in a round robin fashion in accordance with an illustrative embodiment of the present invention. As will be appreciated by one skilled in the art, a striping table would typically be much larger than exemplary striping table 1700. Similarly, the arrangement of the nodes is shown as round robin for exemplary purposes only.

Figure 18:
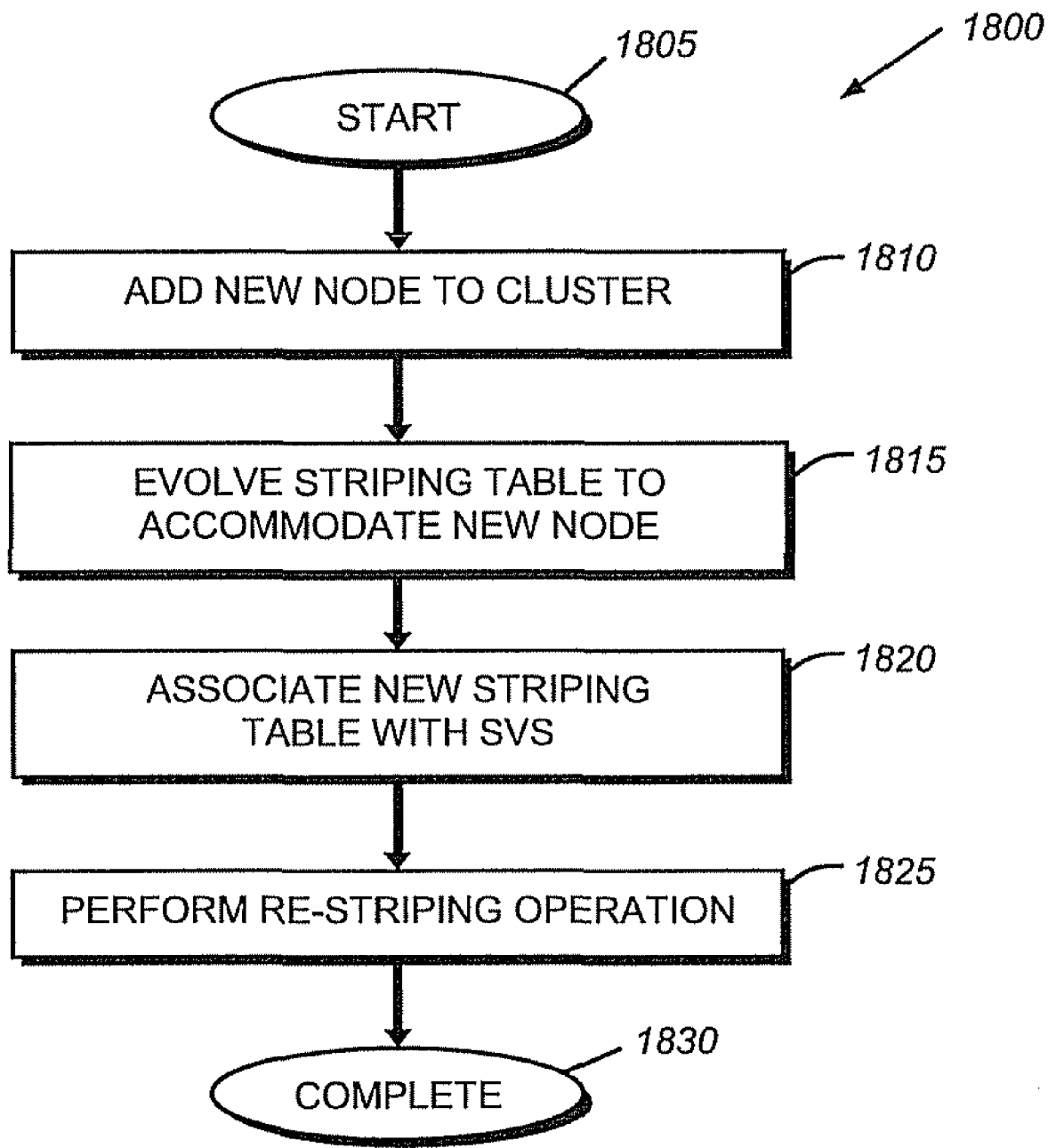
FIG. 18 is a flowchart detailing the steps of a procedure for performing data distribution based on capacity leveling in accordance with an illustrative embodiment of the present invention.
Figure 19A:
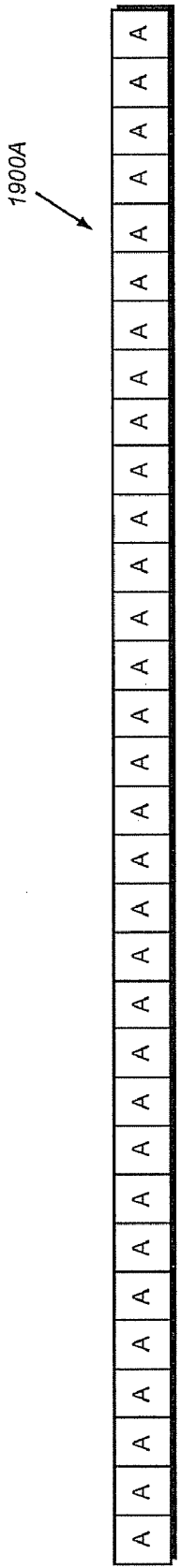
FIGS. 19A-19D are schematic block diagrams illustrating the evolution of a striping table based on addition of nodes in accordance with an illustrative embodiment of the present invention.
Figure 19B:
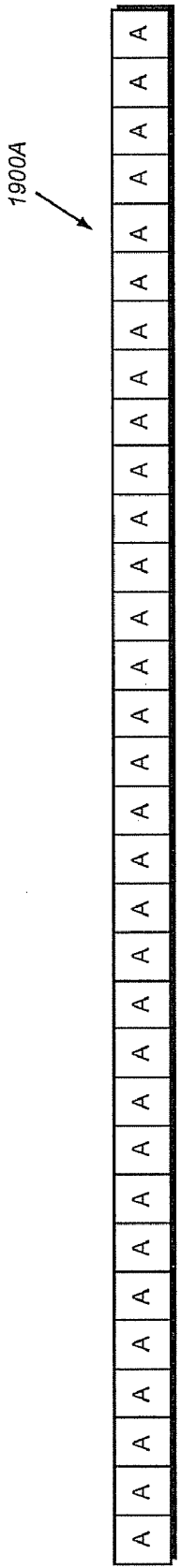
Figure 19C:
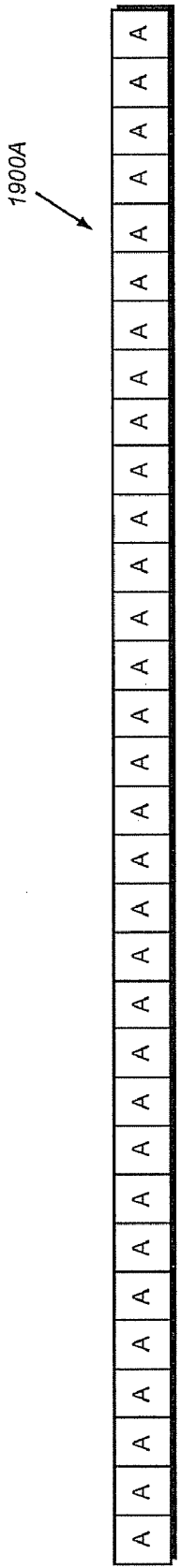
Figure 19D:
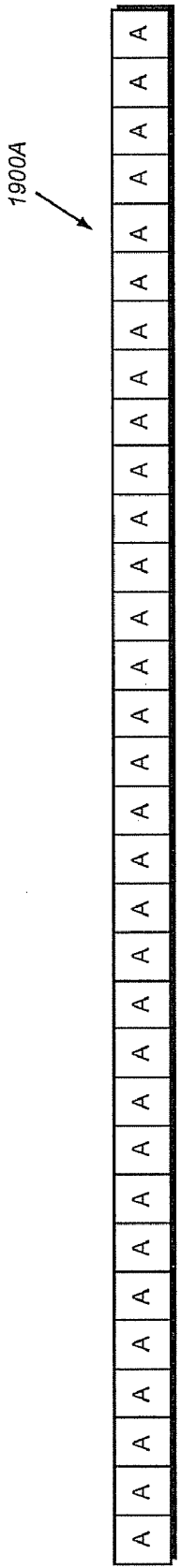

FIG. 18 is a flowchart detailing the steps of a procedure 1800 for evolving a striping table to perform capacity leveling in accordance with an illustrative embodiment of the present invention. The procedure 1800 begins in step 1805 and continues to step 1810 where a new node is added to a cluster. A new node may be added to the cluster by, e.g., the administrator and/or other user physically connecting the new node to the cluster switching fabric 150, configuring the storage operating system and/or other software executing on the N/D modules of the new node, etc.

Additionally, in accordance with one embodiment of the present invention, each of the newly added nodes of the cluster is assigned a capacity value, typically by the vendor (e.g., manufacturer) of the node. However, in alternative embodiments capacity values may be assigned by an administrator and/or through and automated process. This capacity value may be provided to the volume striping module 370 of the nodes of the cluster to begin a striping table evolution technique described further below. In response to the addition of a new node, the striping table is evolved to accommodate the new node in step 1815. Generally, the technique described herein evolves the striping table so that each node appears in approximate proportion to that node's capacity value divided by the total of all capacity values of nodes in the cluster (including the new node). That is, the approximate proportion of node X equals the capacity value of node X divided by the sum of all the capacity values of all nodes of the cluster. Evolution of a striping table is described further below in reference to FIG. 19.

Once the new striping table has been evolved, i.e., iteratively updated the new striping table is then associated with the SVS in step 1820. Illustratively, a re-striping operation is then performed in step 1825. A re-striping operation generally causes all data within the SVS to be re-allocated so that the data is striped in accordance with the evolved striping table, i.e., so that the data is distributed in accordance with the capacity leveling obtained from an embodiment of the present invention. It should be noted that performing a restriping operation is optional. In certain alternative embodiments, data may be re-striped as it is written to the striped volume set.

The procedure 1800 completes in step 1830.

FIGS. 19A-19D are schematic diagrams of an evolving striping table in accordance with an illustrative embodiment of the present invention. For purposes of explanation, with respect to FIG. 19, assume that an administrator desires to establish a four node cluster of heterogenous nodes. The three nodes have the following capacity ratings:

| node A | 100 |
|--------|-----|
| node B | 200 |
| node C | 50  |
| node D | 50  |

As will be appreciated by one skilled in the art, the principles described in this illustrative example may be utilized with any number of the nodes having any number of differing and/or identical capacity values. As such, the description herein of the evolution of striping table 1900 should be taken as an exemplary only. In operation, a striping table is initially generated as a single entry table, such as that shown in FIG. 19A. In a single node cluster, each stripe of data is stored on the single node of the cluster, i.e., node A in this example.

Illustratively, the administrator has configured the volume striping module to indicate that three additional nodes will be added, for a total of four nodes in the cluster. The volume striping module may then begin iteratively adding support for each entry. By first adding the entry for a new node, the volume striping module 370 considers the capacity value not only for the newly added entry but also for other all other entries to be represented within the striping table. By taking this into consideration, the correct number of occurrences of the node A in the striping table will result, which obviates the need to replace instances of node A during further iterations. In one embodiment, each node will appear in the striping table in approximate proportion to its capacity value divided by the sum of all of the capacity values of the nodes in the cluster.

Given the illustrative capacity values described above, the desired representation is equal to the capacity rating of A divided by the total capacity rating, i.e., A divided by A+B+C+D. Illustratively, this equals 100 divided by 400 (100+200+50+50). As such, the volume striping module replaces the number of entries of B+C+D (i.e., the total capacity value of the nodes to be added later) divided by the rating of A+B+C+D (i.e., the total of all of the capacity values), that is 300 out of every 400 entries in the first iteration. By performing mathematical reduction, the volume striping module determines that it is to replace three out of every four entries in the striping table with a B. Replacement within this group should be made by replacing entries of A with the new values of B. Illustratively, the selection of exactly which entries to replace is performed by a semi-static technique, such as that described in U.S. Pat. No. 7,185,144, entitled SEMI-STATIC DISTRIBUTION TECHNIQUE, the contents of which are hereby incorporated by reference.

The VSM 370 then repeats the iterative process by adding the next entry (i.e., entry C). Continuing this example, the volume striping module determines that it is to replace sufficient number of B's in the striping table while leaving the appropriate total number of B's. Again, this may be determined by dividing the rating of those that are to remain by the total rating. This would equal to the rating of C+D divided by the rating of B+C+D, which equals 100/300. By reducing this fraction, the volume striping module has identified that one out of every three B's should be replaced with a C. The final iteration then replaces a sufficient number of C's with D. This number may be calculated by dividing the capacity value of D by the rating of C+D, which equates to every other C (i.e., ½). As can be appreciated from FIG. 19D, this results in a exemplary striping table that has eight references to node A, 16 references to node B, four references to node C and four references to node D.

As will be appreciated, this results in each node being appropriately apportioned based on their capacity ratings. Using node A as a reference, node D appears twice as frequently due to it having a capacity rating twice as large as node A, etc. By performing the iterative technique described herein, capacity leveling may be achieved to provide for optimal use of heterogeneous computers within a cluster.

The foregoing description has been directed to particular embodiments of this invention. It will be apparent, however, that other variations and modifications may be made to the described embodiments, with the attainment of some or all of their advantages. Specifically, it should be noted that the principles described herein may be implemented in non-distributed file systems. Furthermore, while this description has been written in terms of N and D-modules, the teachings herein are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for capacity leveling in a clustered computer system supporting a striped file system comprising:
    assigning a capacity value associated with each node of a plurality of nodes organized as the clustered computer system to support the striped file system;
    iteratively adjusting, by a volume striping module executing on a processor of one of the plurality of nodes, a number of occurrences of a node within a striping data structure to generate a capacity leveled striping data structure based on the capacity value associated with each node; and
    utilizing the capacity leveled striping data structure to perform data allocation in the striped file system in response to data access requests.

2. The method of claim 1 wherein each node appears in the striping data structure in approximate proportion to its capacity value divided by a total of all capacity values of the plurality of nodes.

3. The method of claim 1 further comprising utilizing a semi-static distribution technique to iteratively adjust the number of occurrences of the node within the striping data structure.

4. The method of claim 1 further comprising performing a restriping operation on the striped file system to utilize the capacity leveled striping data structure.

5. The method of claim 1 further comprising determining each node's capacity value using a processor speed of the node.

6. The method of claim 1 wherein the plurality of nodes are associated with differing capacity values.

7. The method of claim 1 further comprising implementing a striped volume set of the striped file system wherein the striped volume set comprises a plurality of volumes with each volume being stored on one of the plurality of nodes.

8. The method of claim 1 further comprising storing an evolved striping data structure in a volume location database that is accessible from each of the plurality of nodes.

9. The method of claim 1 wherein data allocation comprises distributing data across the plurality of nodes in accordance with the capacity leveled striping data structure.

10. A method for generating a capacity leveled striping data structure for use in a clustered computer system supporting a striped file system comprising:
    assigning a capacity value associated with each node of a plurality of nodes organized as the clustered computer system to support the striped file system, wherein the capacity value reflects a determination of processing speed associated with a node as compared to other nodes of the plurality of nodes;
    iteratively adjusting, by a volume striping module executing on a processor of one of the plurality of nodes, a number of occurrences of a node within a striping data structure to generate the capacity leveled striping data structure based on the capacity value associated with each node wherein the capacity leveled striping data structure contains each node in proportion to the node's capacity value divided by a sum of capacity values of all nodes in the clustered computer system; and
    utilizing, by the volume striping module, the capacity leveled striping data structure to allocate data among the nodes of the clustered computer system.

11. A system comprising:
    a set of nodes, each comprising a processor, organized as a cluster configured to support a striped file system comprising a striped volume set apportioned among volumes stored on the set of nodes, wherein each of the set of nodes is associated with a capacity value; and
    a volume striping module, executing on one of the processors, configured to apportion stripes of the striped volume set among the volumes stored on the set of nodes so that each node appears in a striping data structure in approximate proportion to the node's capacity value divided by a total of all capacity values of the set of nodes, wherein the striped file system is further configured to utilize the striping data structure to perform data allocation on the striped file system in response to data access requests.

12. The system of claim 11 wherein the striping data structure is stored in a volume location database accessible by each of the set of nodes.

13. The system of claim 11 wherein each node of the set of nodes is assigned a differing capacity value.

14. The system of claim 11 wherein the volume striping module is further configured to evolve the striping data structure in response to addition of a new node to the set of nodes, wherein the striping data structure comprises entries for each of the set of nodes and the new node in approximate proportion to each node's capacity value divided by a total of all capacity values of the set of nodes and the new node.

15. The system of claim 14 wherein the volume striping module is further configured to perform a restriping operation on the striped volume set using the striping data structure.

16. The system of claim 14 wherein the volume striping module is further configured to evolve the striping data structure by iteratively adjusting a number of occurrences of a node within the striping structure using a semi-static distribution technique.

17. A method comprising:

adding a new node to a set of nodes, each comprising at least a processor, configured as a cluster to support a striped file system of a storage system;

evolving a striping data structure associated with the striped file system to incorporate the new node, wherein the evolved striping data structure comprises entries for each of the set of nodes and the new node in approximate proportion to a capacity value associated with each of the nodes divided by a total of all capacity values of the set of nodes and the new node; and utilizing the capacity leveled striping data structure to perform data allocation on the striped file system in response to data access requests.

18. The method of claim 17 further comprising performing a restriping operation on the striped file system using the evolved striping data structure.

19. The method of claim 17 further comprising storing the striping data structure in a volume location database accessible by each node of the set of nodes and the new node.

20. The method of claim 17 wherein the evolving of the striping data structure utilizes a semi-static distribution technique.

21. The method of claim 17 wherein evolving a striping data structure comprises identifying a capacity value for the new node to be added and dividing the identified capacity value by a total capacity value of the new node to be added and all additional nodes to be added to the striping data structure.

* * * * *